United States Patent [19]

Ping-Hua

[11] Patent Number: 5,572,889
[45] Date of Patent: *Nov. 12, 1996

[54] GEARSHIFT STICK LOCK FOR AUTOMOBILES

[76] Inventor: Wu Ping-Hua, P.O. Box 82-144, Taipei, Taiwan

[ * ] Notice: the term of this patent shall not extend beyond the expiration date of Pat. No. 5,570,600.

[21] Appl. No.: 340,712

[22] Filed: Nov. 16, 1994

[51] Int. Cl.$^6$ .................................................. B60R 25/06
[52] U.S. Cl. ........................ 70/247; 70/DIG. 57; 70/203; 70/417
[58] Field of Search ............................ 70/247, 248, 417, 70/54, 52, 202, 203, 233, 38 A, 39, DIG. 57, 180, 158, 163, 164

[56] References Cited

U.S. PATENT DOCUMENTS

| | | | |
|---|---|---|---|
| 1,592,992 | 7/1926 | Seng | 70/417 |
| 4,426,861 | 1/1984 | Chillis | 70/39 |
| 4,693,099 | 9/1987 | Cykman | 70/247 |
| 4,888,967 | 12/1989 | Kuo | 70/54 |
| 5,157,954 | 10/1992 | Pietras | 70/DIG. 57 |
| 5,163,308 | 11/1992 | Lillo | 70/DIG. 57 |
| 5,228,320 | 7/1993 | Liou | 70/247 |

FOREIGN PATENT DOCUMENTS

| | | | |
|---|---|---|---|
| 3313996 | 10/1984 | Germany | 70/233 |

*Primary Examiner*—Darnell M. Boucher
*Attorney, Agent, or Firm*—Alfred Lei

[57] ABSTRACT

A gearshift stick lock for an automobile having a transmission case includes a lock body, a shackle having two legs engageable with the lock body, a sleeve for wholly fitting over a gearshift stick of the automobile and extending downwardly into the transmission case, the sleeve including two threaded holes and two rings fixed to the sleeve, each of the two rings having a hole aligned with a corresponding one of the threaded holes, two screws each extending through a corresponding one of the threaded holes to bear against the gearshift stick of the automobile thereby fixedly mounting the sleeve thereon, and the legs of the shackle being engaged through the rings respectively and engaged with the lock body so as to lock the gearshift stick in place.

1 Claim, 3 Drawing Sheets

GEARSHIFT STICK LOCK FOR AUTOMOBILES

BACKGROUND OF THE INVENTION

It has been found that automobiles have always been considered one of the most convenient forms of transportation available to us, whether from home to work, or for shopping. Hence, many thieves steal cars and sell to a garage of other places for easy money owing to this basic requirement. In view of this, many kinds of locks have been invented to prevent car theft, such as alarm, door lock, steering wheel lock, and gearshift stick lock etc. Among these, the steering wheel lock is inconvenient to use, the gearshift stick lock is not secure enough to prevent an automobile from being stolen, and the car alarm may sometimes missound.

FIG. 1 shows a prior art locking arrangement for the gearshift stick of a vehicle. As illustrated, such a lock cannot prevent the gearshift stick of a vehicle from being severed below the lock body and the car thief can sever cut off the gearshift stick below the lock body thus freeing the shifting mechanism so that the car can be driven.

Cykman, U.S. Pat. No. 4,693,099, also discloses a locking arrangement for the gearshift stick of vehicles. However, such a locking arrangement still cannot prevent the gearshift stick from being cut off below the lock body.

Therefore, it is an object of the present invention to provide a gearshift stick lock for an automobile which can obviate and mitigate the above-mentioned drawback.

SUMMARY OF THE INVENTION

This invention relates to a gearshift stick lock for an automobile.

It is the primary object of the present invention to provide a gearshift stick lock for an automobile which can effectively prevent the automobile from being stolen.

It is another object of the present invention to provide a gearshift stick lock for an automobile which can prevent a gearshift stick from being cut off with a saw below the lock.

It is still another object of the present invention to provide a gearshift stick lock for an automobile which has a sleeve which wholly fits over the gearshift stick and extends downwardly into the transmission case.

It is still another object of the present invention to provide a gearshift stick lock for an automobile which is easy to operate.

It is a further object of the present invention to provide a gearshift stick lock for an automobile which is simple in construction.

Other objects and merits and a fuller understanding of the present invention will be obtained by those having ordinary skill in the art when the following detailed description of the preferred embodiment is read in conjunction with the accompanying drawings wherein like numerals refer to like or similar parts.

DETAILED DESCRIPTION OF THE PREFERRED EMBODIMENT

Figure 1:
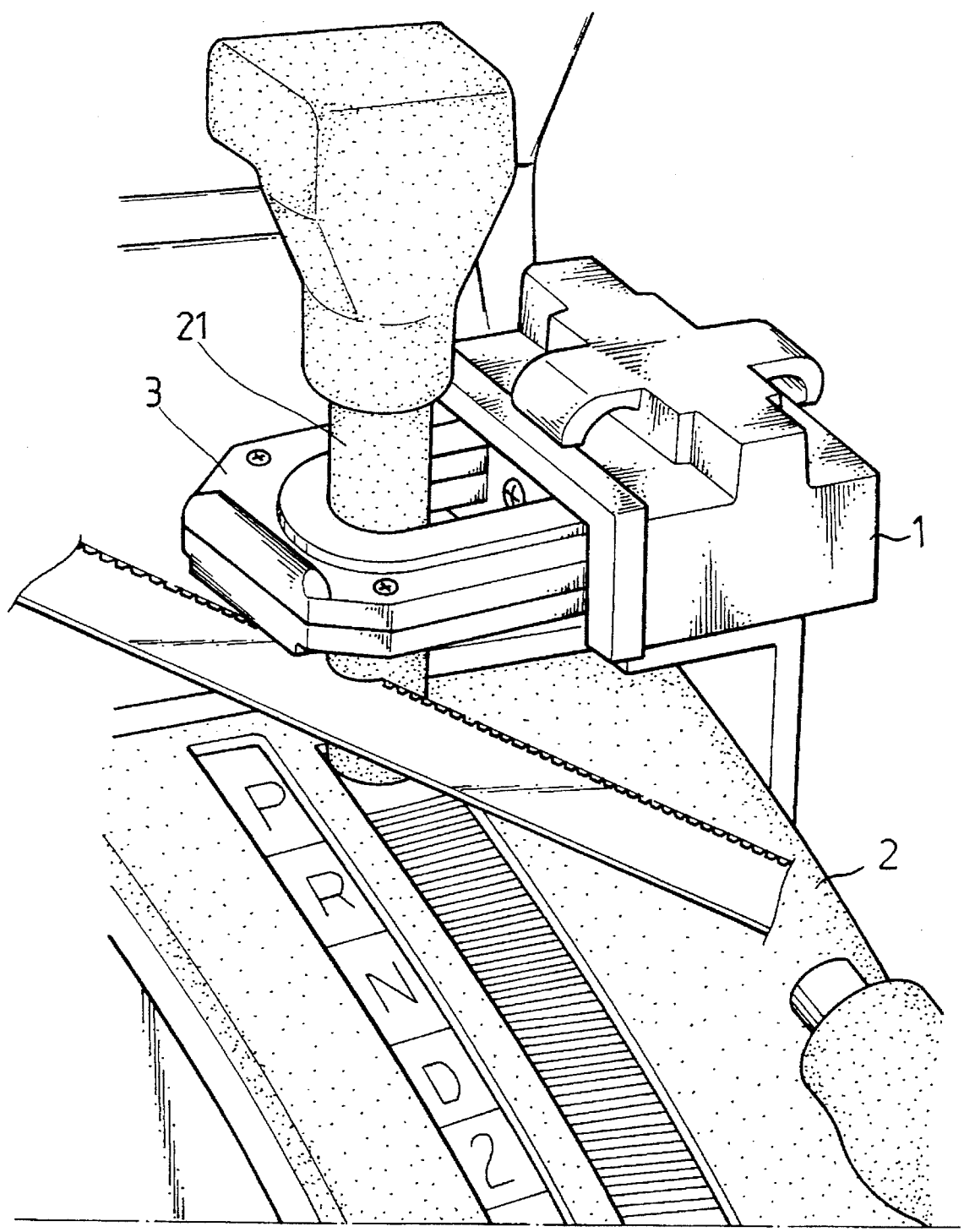
FIG. 1 shows a prior art locking arrangement for the gearshift stick of vehicles.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
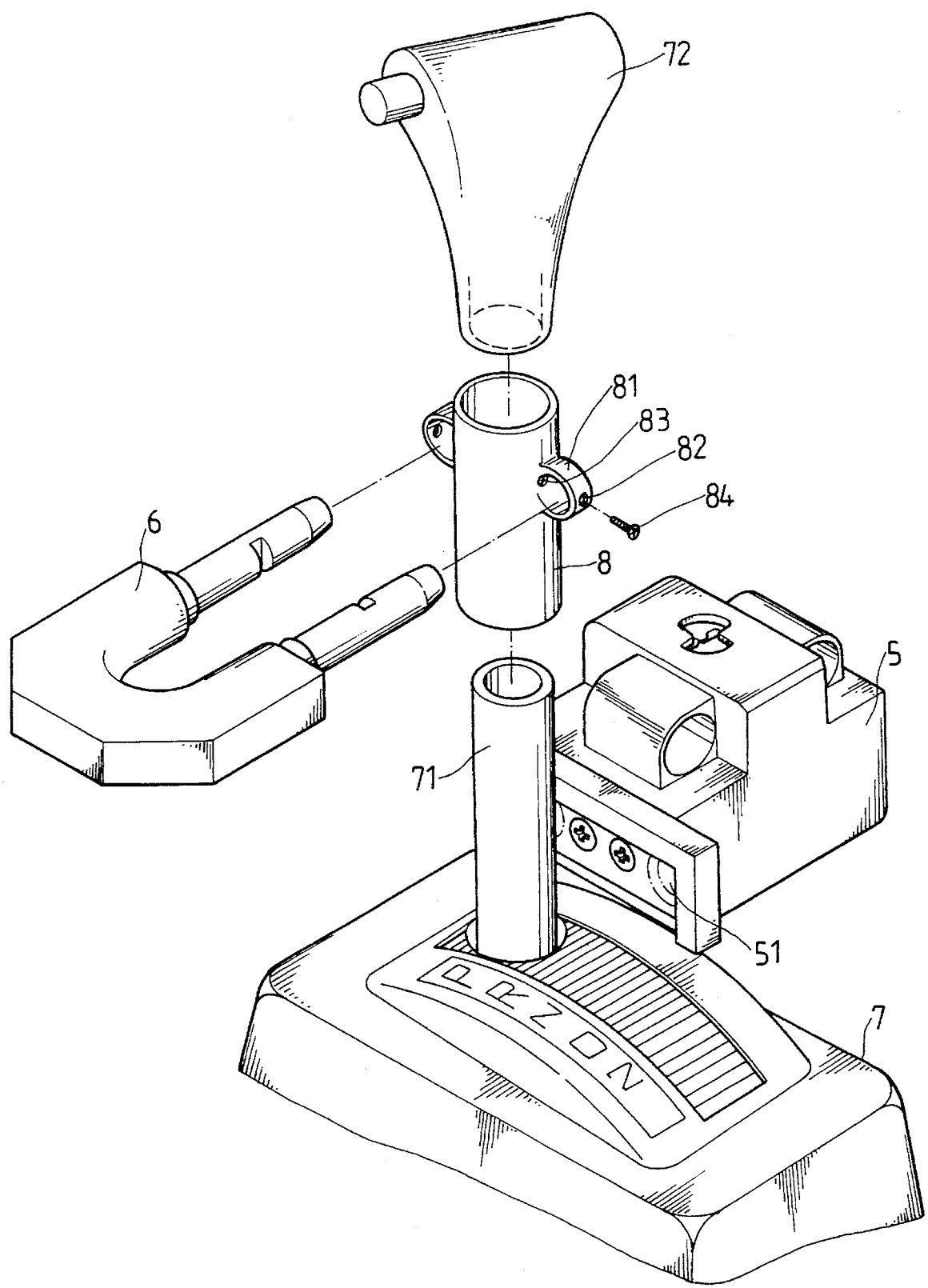
FIG. 2 is an exploded view of the present invention.
Figure 3:
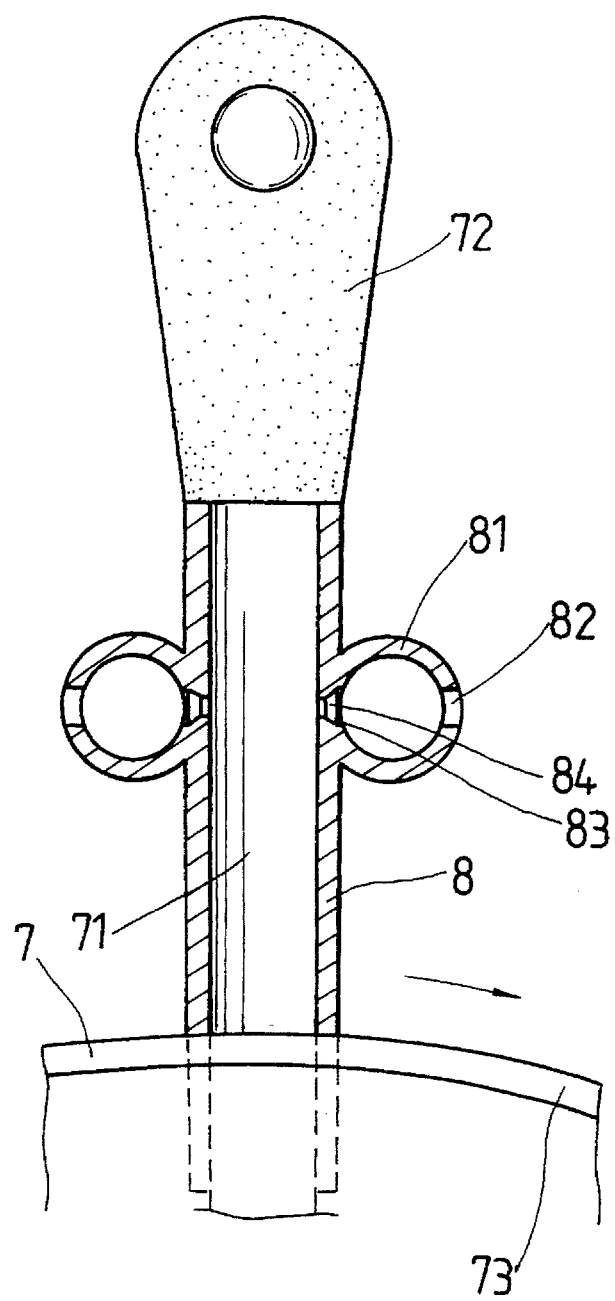
FIG. 3 is a partial sectional view of the present invention.

With reference to the drawings and in particular to FIGS. 2 and 3 thereof, the gearshift stick lock according to the present invention mainly comprises a lock body 5, a shackle 6, and a sleeve 8.

The structure of the lock body 5 may be of any conventional design well known to those skilled in the art and is not considered a part of the invention.

The shackle 6 includes two legs engageable with the lock body 5 so as to lock the gearshift stick 71 of the vehicle in place.

The sleeve 8 is wholly fitted over the gearshift stick 71 of the vehicle and extends downwardly into the gear transmission box 7. Further, the sleeve 8 is provided with two threaded holes 83 and two rings 81 affixed to the sleeve 8. Each of the two rings 81 is formed with a hole 82 which is aligned with a corresponding one of the threaded holes 83 of the sleeve 8.

A screw 84 extends through a corresponding one of the threaded holes 83 of the sleeve 8 to bear against the gearshift stick 71 of the vehicle thereby fixedly mounting the sleeve 9 on the gearshift stick 71.

It should be noted that the lock body 5, the shackle 6 and the sleeve 8 are hardened thereby making it impossible to cut them off with a saw.

Actually, this invention is chiefly characterized in the sleeve 8 which wholly fits over the gearshift stick 71 and extends downwardly into the gear transmission box 7 so that the gearshift stick 71 cannot be severed below the lock body 21 and the gearshift stick 71 can only be cut above the lock body 21 and would still remain immobilized.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A gearshift stick lock for an automobile having a transmission case, comprising:

a lock body;

a shackle including two legs engageable with said lock body;

a sleeve for wholly fitting over a gearshift stick of said automobile and extending downwardly into the transmission case, said sleeve including two threaded holes and two rings having a hole aligned with respective one of said threaded holes; and two screws each extending through a respective one of said threaded holes to bear against the gearshift stick of said automobile thereby fixedly mounting said sleeve on said gearshift stick;

said legs of said shackle being inserted through said lugs to engage said lock body so as to lock said gearshift stick in place.

\* \* \* \* \*